United States Patent [19]
Bose et al.

[11] Patent Number: 5,634,405
[45] Date of Patent: Jun. 3, 1997

[54] METHODS FOR REMOVING INK FROM POLYMERIC SUBSTRATES

[75] Inventors: Ajit K. Bose, Lawrenceville, N.J.; Michael Hughes, Levittown, Pa.; Katherine C. Hlubik, Jacobstown, N.J.

[73] Assignee: Union Camp Patent Holding Co., Princeton, N.J.

[21] Appl. No.: 507,955

[22] Filed: Jul. 27, 1995

[51] Int. Cl.$^6$ ....................................... B41C 3/00
[52] U.S. Cl. ................................ 101/483; 101/424
[58] Field of Search .................... 101/483, 424, 101/423

[56] References Cited

U.S. PATENT DOCUMENTS

| | | | |
|---|---|---|---|
| 3,069,309 | 12/1962 | Lissant | 101/424 |
| 3,099,594 | 7/1963 | Walsh | 101/424 |
| 3,373,118 | 3/1968 | Steppan | 101/424 |
| 4,116,715 | 9/1978 | Smiggen et al. | 101/424 |
| 4,829,897 | 5/1989 | Wyman et al. | 101/483 |
| 5,382,298 | 1/1995 | Bondurant | 101/424 |

FOREIGN PATENT DOCUMENTS

| | | | |
|---|---|---|---|
| 304662 | 3/1989 | European Pat. Off. | 101/424 |
| 2211887 | 7/1974 | France | 101/424 |
| 2102 | 1/1978 | Japan | 101/424 |
| 65697 | 4/1983 | Japan | 101/424 |
| 203086 | 11/1983 | Japan | 101/424 |
| 1172147 | 8/1986 | Japan | 101/424 |
| 1261095 | 11/1986 | Japan | 101/424 |

*Primary Examiner*—Edgar S. Burr
*Assistant Examiner*—Anthony H. Nguyen
*Attorney, Agent, or Firm*—Richard R. Muccino; Charles A. Gaglia, Jr.; Wendy A. Choi

[57] ABSTRACT

The present invention is directed to a method for removing ink from a substrate containing at least one synthetic polymeric resin which comprises contacting the substrate with an aqueous solution of a glycol ether for a time sufficient, and under conditions effective, to remove the ink, wherein the glycol ether may be represented by Formula (I)

$$R_1\text{---}O\text{---}R_2\text{---}OH \qquad (I)$$

wherein $R_1$ and $R_2$ are independently selected from the group consisting of alkyl groups having from 1 to about 8 carbon atoms. This invention also pertains to improved methods for preparing de-inked recycled substrates employing the aqueous solution of glycol ether.

9 Claims, 1 Drawing Sheet

1

METHODS FOR REMOVING INK FROM POLYMERIC SUBSTRATES

FIELD OF THE INVENTION

This invention pertains to improved methods for removing ink from substrates containing a synthetic polymeric resin. More particularly, this invention pertains to methods for removing ink from synthetic polymeric substrates which comprise contacting a substrate, at least partially covered with an ink, with an aqueous solution of a glycol ether for a time sufficient, and under conditions effective, to remove the ink. This invention also pertains to improved methods for preparing de-inked recycled substrates containing a synthetic polymeric resin. In this embodiment, a first substrate having a first shape is de-inked by contacting the first substrate with an aqueous solution of a glycol ether, the de-inked first substrate is then converted to a fluid substrate, and the fluid substrate is cast into a second substrate having a second shape.

DESCRIPTION OF THE BACKGROUND

The term "post-industrial waste", as used herein, refers to plastic waste generated by a manufacturer within its facilities which may then be recycled internally by the plastic manufacturer. The term "post-consumer waste", as used herein, refers to plastic waste generated by an industrial or retail consumer of a manufactured plastic substrate.

Recycling and extending the life cycle of recycled substrates has become of the utmost importance in the packaging field. Although many streams of post-industrial or post-consumer waste plastic are recycled, some streams are difficult or impossible to recycle because of the inherent limitations in the nature of the plastics and the manner in which the plastics have been processed. For example, no efficient or economical method exists for removing ink from certain printed plastic substrates without damaging or altering the plastic itself. Particularly problematic is the removal of ink from thin film thermoplastic bags typically used in grocery stores and department stores as well as thermoplastic bags used to contain garden products, agricultural products, and animal feed products. When the ink is not removed from the bag, the recycled plastic substrate typically has an undesirable color or tint.

As government regulations and social pressure require more recycling and use of higher levels of post-consumer waste in manufactured plastic substrates, it becomes imperative to develop better recycling methods, especially, methods capable of removing printing ink from plastic substrates and methods for producing recycled plastic substrates having little or no color attributable to the printing ink.

Two general classes of synthetic polymeric resins exist: thermoplastic resins and thermosetting resins. The majority of polymeric resins manufactured are thermoplastic resins. Thermoplastic resins are high polymers that soften when exposed to heat and return to their original condition when cooled to room temperature. Natural substances that exhibit thermoplastic behavior are crude rubber and certain waxes. However, the term thermoplastic resin is usually applied to synthetic resins such as polyvinyl chloride, nylons, fluorocarbons, linear polyethylene, polyurethane prepolymer, polystyrene, polypropylene, cellulosic and acrylic resins, acetal resins, thermoplastic polyesters, acrylonitrile-butadiene-styrene terpolymers, cellulose acetate, phenylene oxide-based resins, polycarbonates, poly (methylmethacrylate), polystyrene, poly(vinylchloride), and styreneacrylonitrile copolymers.

Thermosetting resins are high polymers that solidify or set irreversibly when heated. This thermosetting property is usually associated with a cross-linking reaction of the molecular constituents induced by heat or radiation. In many cases, however, it is necessary to add curing agents such as organic peroxides or, in the case of rubber, sulfur. For example, linear polyethylene can be cross-linked to a thermosetting substrate either by radiation or by chemical reaction. Phenolics, alkyds, amino resins, polyesters, epoxides, and silicones are usually considered to be thermosetting, but the term also applies to substrates where additive-induced cross-linking is possible.

U.S. Pat. No. 3,069,308 (Lissant) discloses a method for removing ink from a paper product which comprises pulping the paper with a caustic-free aqueous solution containing an oxyalkylated alcohol.

U.S. Pat. No. 3,099,584 (Walsh) discloses a method for removing the magnetic stripe from a motion picture film which comprises agitating the film ultrasonically in a solvent selected from the group consisting of methylisobutyl ketone, butyl acetate, and 2-ethoxy ethanol.

U.S. Pat. No. 3,373,115 (Steppan) discloses solutions for removing tones from a negative-working planographic printing plate which comprises treating the plate with an organic solvent, such as ethers of ethylene glycol including ethylene glycol monoethyl ether, in conjunction with an acid having a dissociation constant greater than $10^4$ at 25° C., and/or a salt of such an acid with a base such as ammonia, hydroxylamine, hydrazine, or an organic base having a dissociation constant less than $10^3$ at 25° C.

French Patent publication no. 2,211,887 discloses methods for selectively removing ink from a lithographic printing plate using an aqueous solution of ethylene glycol monoethyl ether acidified with phosphoric acid. The preferred concentration range of the aqueous solution comprises from about 30% to about 50% of ethylene glycol monoethyl ether, by weight.

SUMMARY OF THE INVENTION

The present invention is directed to a method for removing ink from a substrate containing at least one synthetic polymeric resin which comprises contacting a substrate, at least partially covered with an ink, with an aqueous solution consisting essentially of a glycol ether for a time sufficient, and under conditions effective, to remove the ink, wherein the glycol ether may be represented by Formula (I)

$$R_1-O-R_2-OH \qquad (I)$$

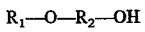

wherein $R_1$ and $R_2$ are independently selected from the group consisting of alkyl groups having from 1 to about 8 carbon atoms.

In another embodiment, the present invention is directed to a method for preparing a de-inked recycled substrate containing at least one synthetic polymeric resin which comprises the steps of:

(a) providing a first substrate containing at least one synthetic polymeric resin, wherein the first substrate has a first shape and bears ink on a portion of its surface;

(b) removing the ink in step (a) by contacting the first substrate with an aqueous solution consisting essentially of a glycol ether for a time sufficient, and under conditions effective, to remove the ink, wherein the glycol ether may be represented by Formula (I)

$$R_1-O-R_2-OH \qquad (I)$$

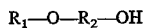

wherein $R_1$ and $R_2$ are independently selected from the group consisting of alkyl groups having from 1 to about 8 carbon atoms;

(c) converting the de-inked first substrate in step (b) to a fluid substrate; and (d) casting the fluid substrate in step (c) into a second substrate having a second shape.

BRIEF DESCRIPTION OF THE FIGURE

The advantages of the present invention may be better understood by reference to the accompanying figure, in which.

DETAILED DESCRIPTION OF THE INVENTION

Figure 1:
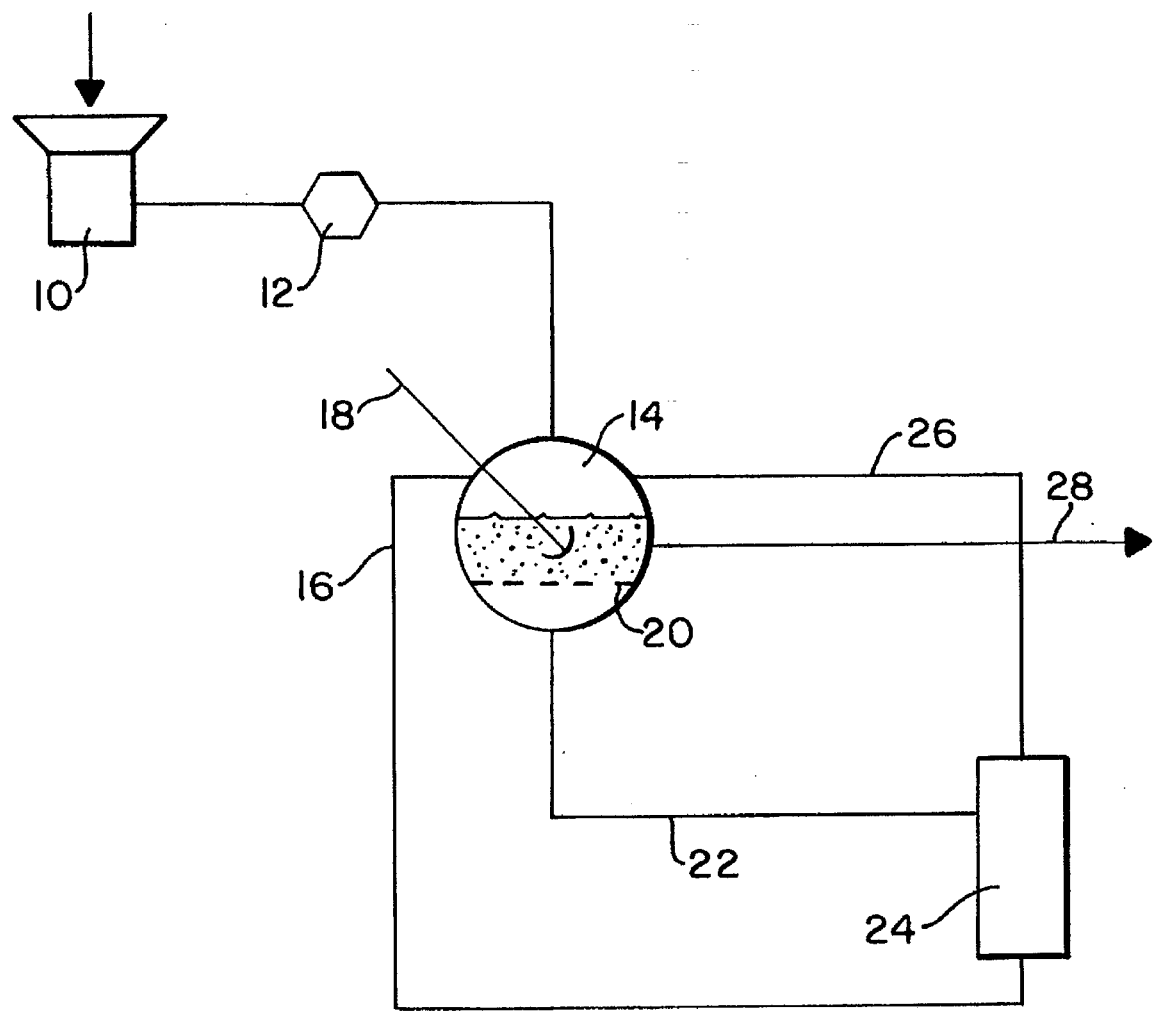
FIG. 1 shows an ink removal apparatus which may be employed to carry out the method of the present invention for removing ink from a substrate containing a synthetic polymeric resin.

In accord with the present invention, applicants have discovered that aqueous solutions of glycol ethers can be used to remove a wide variety of inks from a wide variety of printed polymeric substrates, without the addition of organic or inorganic acids or salts thereof. The glycol ethers employed in the solutions are capable of removing inks of the types utilized in printing upon the polymeric substrates without adversely effecting the substrates. In addition, the glycol ethers are sufficiently volatile so as to be removable from the substrates, yet are not so volatile that they present safety concerns. The aqueous solution of glycol ethers may also be employed in an improved method for preparing de-inked recycled substrates.

The inks which can be removed from a substrate containing a synthetic polymeric resin can be substantially dry, or solid, or can be in a liquid state. The inks may be flexographic, gravure, or intaglio and may include colorants, such as pigments or dyes. The inks may comprise resinous binder systems based upon styrene acrylic copolymers, polyamides, nitrocellulose, rosin and/or polyester. The inks must be soluble in the aqueous glycol ether solutions of the present invention. Representative inks include BB Veraflex™ solvent-based inks available from ICI Specialty Inks (Zeneca), Dayton, N.J.; and Permaprint™ water-based inks, available from Crown Zellerbach, St. Louis, Mo. Preferably, the ink is selected from the group consisting of solvent-based inks and water-based inks.

The printed polymeric substrates from which ink can be removed according to the method of the present invention comprise post-industrial waste polymeric substrates, post-consumer waste polymeric substrates, and mixtures thereof. In a preferred embodiment, the substrate consists essentially of post-consumer waste. More preferably, the substrate consists essentially of post-consumer waste in the form of thermoplastic bags or films having a film thickness from about 0.3 to about 15 mils. Such substrates can be imprinted with any of the many water-based or solvent-based printing inks known in the art.

The polymeric substrates of the present invention comprise known thermosetting and thermoplastic resins which will not be adversely affected or degraded, either chemically or physically, by the aqueous solutions of glycol ethers utilized in the de-inking process of the present invention. Preferably, the polymeric substrate is a thermoplastic resin such as polyethylene, polypropylene, polycarbonate, polyamide, and polyethylene terephthalate. The most preferred polymeric substrate is polyethylene.

As set out above, the glycol ethers useful for removing ink from a substrate containing a synthetic polymeric resin according to the present invention may be represented by formula (I)

(I)

In formula (I), $R_1$ and $R_2$ are independently selected from the group consisting of alkyl groups having from 1 to about 8 carbon atoms, more preferably from 1 to about 6 carbon atoms, and most preferably from 2 to about 4 carbon atoms. Alkyl groups of the invention include but are not limited to straight chain, branched chain, and cyclic hydrocarbons such as methyl, ethyl, propyl, butyl, pentyl, hexyl, heptyl, octyl, isopropyl, 2-butyl, isobutyl, 2-methylbutyl, isopentyl, cyclohexyl moieties, and the like. Preferably, at least one of $R_1$ and $R_2$ is ethyl. More preferably, both $R_1$ and $R_2$ are ethyl such that the glycol ether is 2-ethoxyethanol ($C_2H_5OCH_2CH_2OH$, ethylene glycol monoethyl ether).

The glycol ethers of the present invention must be capable of removing inks of the types utilized in printing upon the polymeric substrates without adversely effecting those substrates and must be sufficiently volatile so as to be removable from the substrates, yet not so volatile that they present a safety hazard.

Generally, the aqueous solutions of glycol ether contain from about 60% to about 99% glycol ether, by weight. Preferably, the aqueous solutions contain from about 70% to about 99% glycol ether, and more preferably about 80% glycol ether, by weight. The aqueous solutions of the invention typically have a pH value between about 5 and about 9.

In accord with the present invention, the substrate containing at least one synthetic polymeric resin is contacted with an aqueous solution of a glycol ether for a time sufficient, and under conditions effective, to remove the ink. The amount of time and exact conditions required may be varied and will depend upon a variety of factors such as the ambient temperature; the chemical composition of the ink, the polymeric substrate, and the glycol ether; the quantity and concentration of ink relative to the surface area of the polymeric substrate, and the concentration of the glycol ether in the aqueous solution. In general, higher temperatures, lower ink concentrations, and higher concentrations of glycol ether lead to shorter contact times. Aqueous solutions containing from about 80% to about 99% glycol ether, by weight, will remove ink nearly instantaneously from polyethylene film at about 25° C., with minimal agitation or rubbing.

The printed substrates formed from polymeric resin can be treated directly with the aqueous glycol ether solutions of the invention or can be converted by cutting, chopping, or shredding prior to such treatment. In one embodiment shown in FIG. 1, printed substrate is introduced into feeder 10 and is preferably converted to size using chopping or grinding device 12. The converted substrate is then fed into reactor 14. In reactor 14, the converted substrate is mixed or otherwise contacted with an aqueous glycol ether solution of the invention provided by line 16. Such contacting, which provides substantially ink-free resin, preferably is carried out by agitating or rubbing the converted substrate, such as that provided by stirrer 18.

Substantially ink-free substrate can be separated from the aqueous glycol ether solution of the invention using any suitable means. For example, the aqueous glycol ether solution can be strained from reactor 14 using screen 20. The aqueous glycol ether solution can be discarded or can be recycled for further ink removal. For example, FIG. 1 shows a closed-loop system wherein the strained glycol ether aqueous solution is passed through line 22 to a distillation and/or filtration apparatus 24 and then returned to reactor 14. Optionally, gaseous effluent from reactor 14 also can be directed to apparatus 24 via line 26 for recycling. The substantially ink-free substrate is then removed from the reactor via belt or line 28. The ink removal processes of the present invention can be implemented in either a batch or continuous fashion.

The substantially ink-free substrate can be further processed to provide recycled products having little or no color attributable to printing ink. The substantially ink-free substrates of the present invention can be used in many of the numerous resin recycling processes known in the art. Numerous recycling processes have been developed as disclosed in the February 1992 issue of Packaging, pp. 43–52, and in the 4 May 1992 issue of Supermarket News, p. 62. In general, recycling methods for preparing a de-inked recycled substrate containing at least one synthetic polymeric resin comprise the steps of: (a) providing a first substrate containing at least one synthetic polymeric resin, wherein the first substrate has a first shape and bears ink on a potion of its surface; (b) removing the ink by contacting the first substrate with an aqueous solution of a glycol ether of the present invention for a time sufficient, and under conditions effective, to remove the ink; (c) converting the de-inked first substrate to a fluid substrate by melting or chemical decomposing; and casting, extruding, or molding the fluid substrate into a second substrate having a second shape such as a pellet or some other desired shape.

Throughout this application, various publications have been referenced. The disclosures in these publications are incorporated herein by reference in order to more fully describe the state of the art.

The present invention is further illustrated by the following examples which are not intended to limit the effective scope of the claims. All parts and percentages in the examples and throughout the specification and claims are by weight of the final composition unless otherwise specified.

EXAMPLES

This example illustrates a comparison of aqueous solutions having different concentration ranges of the glycol ether, 2-ethoxyethanol, versus the ability of the solutions to remove solvent printing ink from a substrate containing the synthetic polymeric resin, polyethylene.

200 microliters of descending concentrations of aqueous 2-ethoxyethanol were measured using an automatic micro pipet. The aqueous 2-ethoxyethanol solutions were then dropped onto printed polyethylene film. The drop was allowed to sit undisturbed for about 1 minute and then was rubbed into the film with a cotton swab.

The results of the examples are set out below in Table 1. 100% to 80% 2-ethoxyethanol solution easily removed the ink. 70% to 60% 2-ethoxyethanol solution required vigorous rubbing to remove the ink. 50% 2-ethoxyethanol solution did not remove the ink adequately. Accordingly, an 80% aqueous solution of 2-ethoxyethanol with slight agitation or rubbing will remove the ink from printed polyethylene film.

TABLE 1

| % 2-ethoxyethanol | 2-ethoxyethanol microliters | water microliters | ink removal ability |
|---|---|---|---|
| 100 | 200 | 0 | yes |
| 90 | 180 | 20 | yes |
| 80 | 160 | 40 | yes, slight |
| 70 | 140 | 60 | yes, with vigorous rubbing |
| 60 | 120 | 80 | yes, with vigorous rubbing |
| 50 | 100 | 100 | no |
| 40 | 80 | 120 | no |
| 30 | 60 | 140 | no |

TABLE 1-continued

| % 2-ethoxyethanol | 2-ethoxyethanol microliters | water microliters | ink removal ability |
|---|---|---|---|
| 20 | 40 | 160 | no |
| 10 | 20 | 180 | no |

The invention being thus described, it will be obvious that the same may be varied in many ways. Such variations are not to be regarded as a departure from the spirit and scope of the invention and all such modifications are intended to be included within the scope of the following claims.

We claim:

1. A method for preparing a de-inked recycled substrate comprising a thermoplastic resin which comprises the steps of:

(a) providing a first substrate comprising a thermoplastic resin, wherein the first substrate has a first shape and bears ink on a portion of its surface;

(b) removing the ink in step (a) by contacting the first substrate with an aqueous solution consisting essentially of a glycol ether for a time sufficient to remove the ink, wherein the glycol ether is represented by Formula (I)

$$R_1\text{—}O\text{—}R_2\text{—}OH \qquad (I)$$

wherein $R_1$ and $R_2$ are independently selected from the group consisting of alkyl groups having from 1 to about 8 carbon atoms;

(c) converting the de-inked first substrate in step (b) to a fluid substrate; and (d) casting the fluid substrate in step (c) into a second substrate having a second shape.

2. The method according to claim 1, wherein the ink is selected from the group consisting of solvent-based inks and water-based inks.

3. The method according to claim 1, wherein the thermoplastic resin is selected from the group consisting of polyethylene, polypropylene, polycarbonate, polyamide, and polyethylene terephthalate.

4. The method according to claim 3, wherein the thermoplastic resin is polyethylene.

5. The method according to claim 1, wherein $R_1$ and $R_2$ are independently alkyl groups having from 1 to about 6 carbon atoms.

6. The method according to claim 5, wherein $R_1$ and $R_2$ are independently alkyl groups having from 2 to about 4 carbon atoms.

7. The method according to claim 6, wherein $R_1$ and $R_2$ are ethyl groups and the glycol ether is ethylene glycol monoethyl ether.

8. The method according to claim 1, wherein the glycol ether solution comprises from about 60% to about 99% of the glycol ether, by weight.

9. The method according to claim 8, wherein the glycol ether solution comprises from about 70% to about 99% of the glycol ether, by weight.

* * * * *